United States Patent
Maloo et al.

(10) Patent No.: US 11,799,951 B1
(45) Date of Patent: Oct. 24, 2023

(54) PREVENTING DATA SPILLAGE IN MULTI-TENANT SERVICES VIA REQUEST AND RESPONSE CONTAINERIZATION WITH PROVENANCE CHECKS

(71) Applicant: MICROSOFT TECHNOLOGY LICENSING, LLC, Redmond, WA (US)

(72) Inventors: Raghvendra Maloo, Sammamish, WA (US); Vivek Roy, Vancouver (CA); Mohammad Reza Tajvidi, Vancouver (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/840,088

(22) Filed: Jun. 14, 2022

(51) Int. Cl.
*H04L 67/1014* (2022.01)
*H04L 67/63* (2022.01)
*H04L 67/51* (2022.01)
*G06F 9/50* (2006.01)

(52) U.S. Cl.
CPC ........ *H04L 67/1014* (2013.01); *G06F 9/5027* (2013.01); *H04L 67/51* (2022.05); *H04L 67/63* (2022.05)

(58) Field of Classification Search
CPC ..... H04L 67/1014; H04L 67/51; H04L 67/63; G06F 9/5027
USPC ........................................................ 709/223
See application file for complete search history.

(56) References Cited

U.S. PATENT DOCUMENTS

| | | | |
|---|---|---|---|
| 9,703,611 B1* | 7/2017 | Christopher | G06F 11/3466 |
| 2006/0235831 A1* | 10/2006 | Adinolfi | G06Q 40/00 |
| 2018/0309747 A1* | 10/2018 | Sweet | G06F 9/45558 |

OTHER PUBLICATIONS

"Application Container Security Guide", Retrieved from: https://csrc.nist.gov/publications/detail/sp/800-190/final, Sep. 2017, 3 Pages.
"Deploying Cyber Secure Plus is Fast and Easy", Retrieved from: https://web.archive.org/web/20210420193422/https://www.netrio.com/deploying-cyber-secure-plus-is-fast-and-easy/, Apr. 20, 2021, 7 Pages.

(Continued)

*Primary Examiner* — Wing F Chan
*Assistant Examiner* — Leon Y Tseng
(74) *Attorney, Agent, or Firm* — David W. Foster; Newport IP, LLC

(57) ABSTRACT

The techniques disclosed herein prevent data spillage in multi-tenant services via request and response containerization with provenance checks. When a web request is received on behalf of a tenant, a request container is created and initialized with identifying information extracted from the request. Derived identifiers that can be verified as being associated with the tenant may be added to the request container. A response container for accumulating data obtained while processing the request is then created. The request and response containers are passed throughout the call path that processes the request. Identifying information passed to data access operations is obtained from the request container, while results of data access operations are stored in the response container. Before generating a web response using data from the response container, the response container is verified to contain data associated with the appropriate request.

20 Claims, 13 Drawing Sheets

(56) References Cited

OTHER PUBLICATIONS

"Most effective way to manage multiple tenant storage in Azure?", Retrieved from: https://web.archive.org/web/20150328092621/https://stackoverflow.com/questions/29190763/most-effective-way-to-manage-multiple-tenant-storage-in-azure, Mar. 18, 2015, 6 Pages.

"Multi Tenancy and container support in Spring Webflow application", Retrieved from: https://softwareengineering.stackexchange.com/questions/429017/multi-tenancy-and-container-support-in-spring-webflow-application, Retrieved Date: Mar. 22, 2022, 2 Pages.

"Prevent Data Leak from Implicit Caching in Multi-Tenant Cloud Application", Retrieved from: https://softwareengineering.stackexchange.com/questions/436381/prevent-data-leak-from-implicit-caching-in-multi-tenant-cloud-application. Retrieved Date: Mar. 22, 2022, 5 Pages.

"Using attributes for access control as a form of attribute-based access control", Retrieved from: https://web.archive.org/web/20210114235429/https://docs.aws.amazon.com/cognito/latest/developerguide/attributes-for-access-control.html, Jan. 14, 2021, 451 Pages.

Avrahami, Yuval, "Finding Azurescape—Cross-Account Container Takeover in Azure Container Instances", Retrieved from: https://unit42.paloaltonetworks.com/azure-container-instances/, Sep. 9, 2021, 24 Pages.

Blendea, et al., "Cross-tenant inbound and outbound restrictions (preview)", Retrieved from: https://docs.microsoft.com/en-us/power-platform/admin/cross-tenant-restrictions. May 27, 2022, 18 Pages.

Eyskens, Stephane, "Azure Architecture Walkthrough: Building a multi-tenant Azure Architecture for a B2C scenario", Retrieved from: https://techcommunity.microsoft.com/t5/azure-developer-community-blog/azure-architecture-walkthrough-building-a-multi-tenant-azure/ba-p/1278357, Apr. 5, 2020, 13 Pages.

Gao, et al., "ContainerLeaks: Emerging Security Threats of Information Leakages in Container Clouds", In Proceedings of 47th Annual IEEE/IFIP International Conference on Dependable Systems and Networks, Jun. 26, 2017, pp. 237-248.

Lasker, Steve, "Azure Container Registry: Mitigating data exfiltration with dedicated data endpoints", Retrieved from: https://azure.microsoft.com/en-us/blog/azure-container-registry-mitigating-data-exfiltration-with-dedicated-data-endpoints/, Apr. 30, 2020, 9 Pages.

Myers, et al., "Prevent anonymous public read access to containers and blobs", Retrieved from: https://docs.microsoft.com/en-us/azure/storage/blobs/anonymous-read-access-prevent, Sep. 23, 2021, 20 Pages.

Seals, Tara, "Azurescape' Kubernetes Attack Allows Cross-Container Cloud Compromise", Retrieved from: https://threatpost.com/azurescape-kubernetes-attack-container-cloud-compromise/169319/, Sep. 9, 2021, 9 Pages.

Simpson, et al., "Host firewall reporting in Microsoft Defender for Endpoint", Retrieved from: https://docs.microsoft.com/en-us/microsoft-365/security/defender-endpoint/host-firewall-reporting?view=o365-worldwide, May 24, 2022, 10 Pages.

Valencia, et al., "Container Security Checklist: From the image to the workload", Retrieved from: https://github.com/krol3/container-security-checklist, Apr. 22, 2022, 18 Pages.

Zhai, et al., "CQSTR: Securing Cross-Tenant Applications with Cloud Containers", In Proceedings of the Seventh ACM Symposium on Cloud Computing, Oct. 5, 2016, 14 Pages.

Yadav, et al., "Security Solution to Prevent Data Leakage Over Multitenant Cloud Infrastructure", In International Journal of Pure and Applied Mathematics, vol. 118, Issue 7, 2018, pp. 269-276.

"Container (type theory)", Retrieved From: https://en.wikipedia.org/w/index.php?title=Container_(type_theory)&oldid=969896881, Jul. 28, 2020, 2 Pages.

Madurai, Vivek, "Multi-tenancy in REST API", Retrieved From: https://medium.com/@vivekmadurai/multi-tenancy-n-rest-api-a570d728620c, Oct. 7, 2019, 11 Pages.

"International Search Report and Written Opinion Issued in PCT Application No. PCT/US23/022299", dated Aug. 25, 2023, 13 Pages.

Szabo, Daniel, "Benefits of Read-Only Coding in C#", Retrieved From: https://www.pluralsight.com/guides/benefits-of-read-only-coding-in-c, Feb. 24, 2020, 8 Pages.

\* cited by examiner

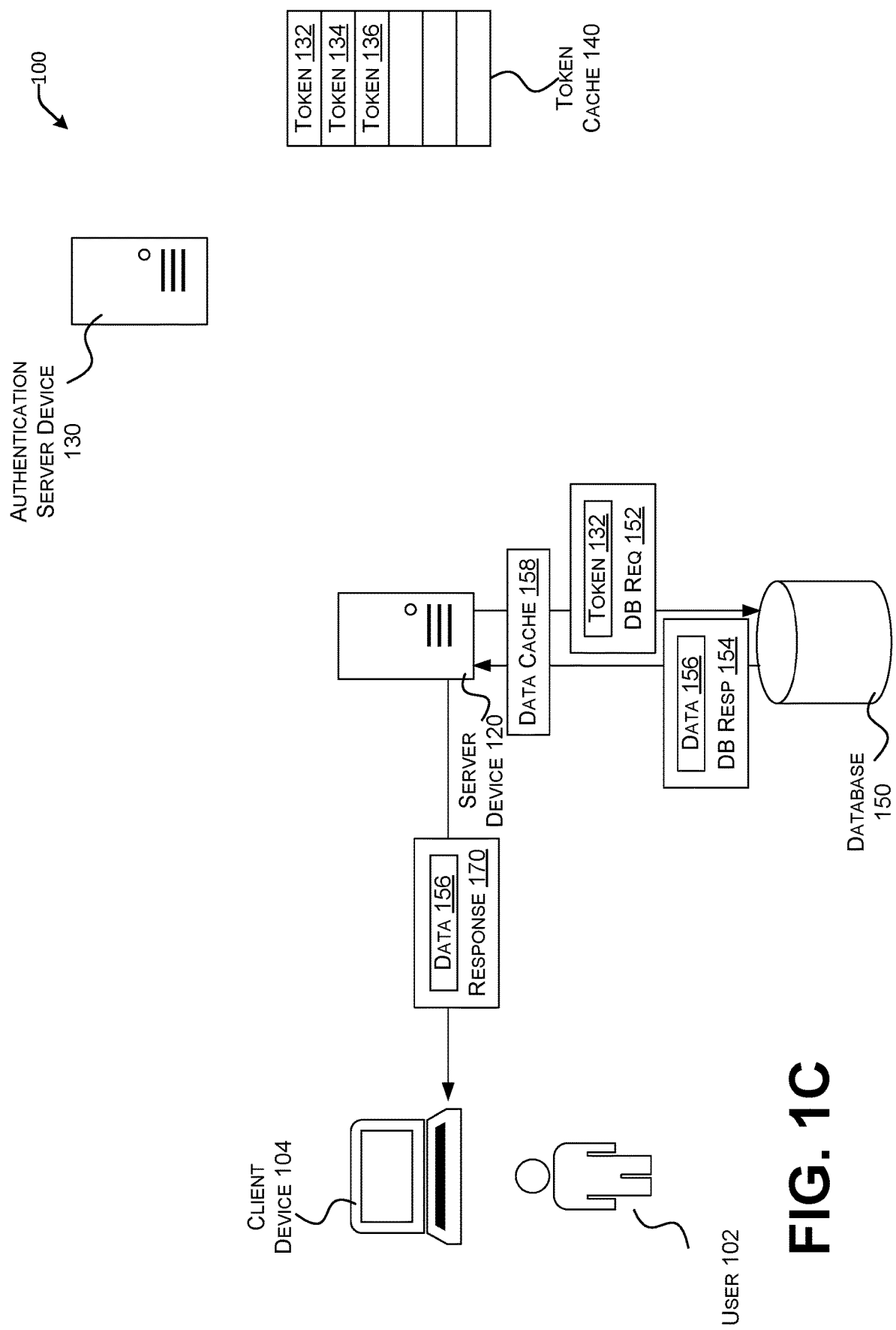

PREVENTING DATA SPILLAGE IN MULTI-TENANT SERVICES VIA REQUEST AND RESPONSE CONTAINERIZATION WITH PROVENANCE CHECKS

BACKGROUND

Cloud based services use pools of computing resources to process requests from different tenants. Sharing resources across tenants utilizes the resources more efficiently than allocating dedicated resources to each tenant. However, using shared resources to process requests from different tenants introduces the possibility of data spillage—the unintentional exposure of one tenant's data to a different tenant. For example, a service may cache a tenant related identifier, and then re-use that identifier while processing a request from a different tenant. Any data access performed using the cached identifier will retrieve data for the wrong tenant, leading to data spillage. These mistakes are hard to find manually in a code review or even when applying static code analysis.

The consequences of data spillage can be severe, exposing sensitive financial information, trade secrets, or other confidential data. The cloud service provider may also suffer a significant reputational loss whenever data spillage is discovered.

It is with respect to these and other considerations that the disclosure made herein is presented.

SUMMARY

The techniques disclosed herein prevent data spillage in multi-tenant services via request and response containerization with provenance checks. When a web request is received on behalf of a tenant, a request container is created and initialized with identifying information extracted from the request. Derived identifiers that can be verified as being associated with the tenant may be added to the request container. A response container for accumulating data obtained while processing the request is then created. The request and response containers are passed throughout the call path that processes the request. Identifying information passed to data access operations is obtained from the request container, while results of data access operations are stored in the response container. Before generating a web response using data from the response container, the response container is verified to contain data associated with the appropriate request.

Technical solutions to the problems described above consist of various mechanisms that can detect and prevent cross-tenant data spillage. One mechanism ensures that the identifying information used to process a request is accurate—e.g. a call path processing a web request does not accidentally use stale or corrupted identifying information. Consistently using the correct identifying information prevents data from one tenant from accidentally being returned to a different tenant.

Specifically, data extracted from a web request is containerized—stored in an immutable object that cannot be tampered with while processing the request. The extracted data includes identifying information such as identifiers, tokens, and other user-supplied data. An identifier is a unique sequence of characters that identifies an entity in the cloud service. Examples of identifiers include a tenant identifier, a user identifier, and an organization identifier. One example of a token is a user authentication token that confirms an identity of a user. The extracted identifying information is treated as a source of ground truth because it originates from the request. Storing the extracted identifying information in an immutable object ensures that it is not swapped, overwritten, corrupted, or otherwise altered before being used.

The request container is made available throughout the call path that processes the web request, and is used as a source of identifying information when invoking data access APIs. For example, when generating a database query, a tenant identifier parameter is obtained from the request container. Because the tenant identifier is stored immutably in the request container, the possibility of using a swapped, cached, corrupted, or otherwise improper identifier when invoking the database query is significantly reduced.

A second mechanism allows adding derived identifiers— including derived tokens—to the request container. A derived identifier refers to an identifier or token that is not extracted from the web request. For example, an "on-behalf" of (OBO) token that is obtained from an authentication service may be added to a request container. Before being added to the request container, derived identifiers are first confirmed to be associated with the request's tenant. This ensures that any identifiers stored in a request container are obtained directly from the web request or are otherwise provably associated with the tenant. In some configurations, derived identifiers are confirmed to be associated with the tenant by cryptographically verifying that the derived identifier contains the tenant identifier associated with the request being processed. Once a derived identifier has been stored in a request container, the derived identifier may be used as a parameter when invoking cloud services while processing the web request.

A third mechanism containerizes data used to generate a response to the web request. In some configurations, a response container is initialized with a request container or a request identifier that uniquely refers to the request container. Throughout this document, when reference is made to storing or comparing against a request container, it is similarly contemplated to store or compare against a request identifier of the request container. The request container is stored in the response container and used to verify that any data added to the response container is associated with the proper request. Specifically, data accessor methods that assign data to the response container also accept a request container as a parameter. Before allowing data to be added to the response container, the response container first verifies that the request container parameter matches the request container stored in the response container. This ensures that only data for the appropriate request is added to the response container.

A fourth mechanism applies a provenance check to a response container before generating a web response. Specifically, when generating a web response to the web request, a response container is verified to store the request container that was generated for the web request. This ensures that only data associated with the tenant of the web request is used to generate the response—i.e. ensuring that an incorrect response container is not accidentally used to leak cross-tenant data into the response.

A fifth mechanism ensures that request and response containerization is consistently applied when invoking user data APIs. A user data API refers to a function that retrieves data based on an identifier. Typically, a user data API is user generated code that invokes a data access API provided by the cloud service. In some configurations, a static source code analysis of the user data API verifies that only an identifier retrieved from a request container is provided as the identifier argument of the data access API. Invocations of data access APIs that use identifiers not retrieved from a request container are flagged as a potential cross-tenant data spillage vulnerability.

For example, source code of a data access API may be analyzed to identify parameters that have a "user input" annotation. This annotation signifies that values passed into these parameters should provably be associated with the tenant of the request. The static source code analysis may identify all invocations of this data access API and ensure that at each call site, all values passed to parameters annotated as "user input" originate from a request container. Invocations of data access APIs with "user input" parameters that do not originate from a request container may use stale values that are not associated with the current web request.

Similarly, a static source code analysis may verify that the data returned from a cloud service data access API is stored directly in a response container. Data that is stored elsewhere is flagged as a potential cross-tenant data spillage vulnerability, as data not stored in a response container may leak into a response sent to a different tenant.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIGS. 1A-1C illustrate processing a web request in a manner consistent with the prior art.

DETAILED DESCRIPTION

Figure 1A:
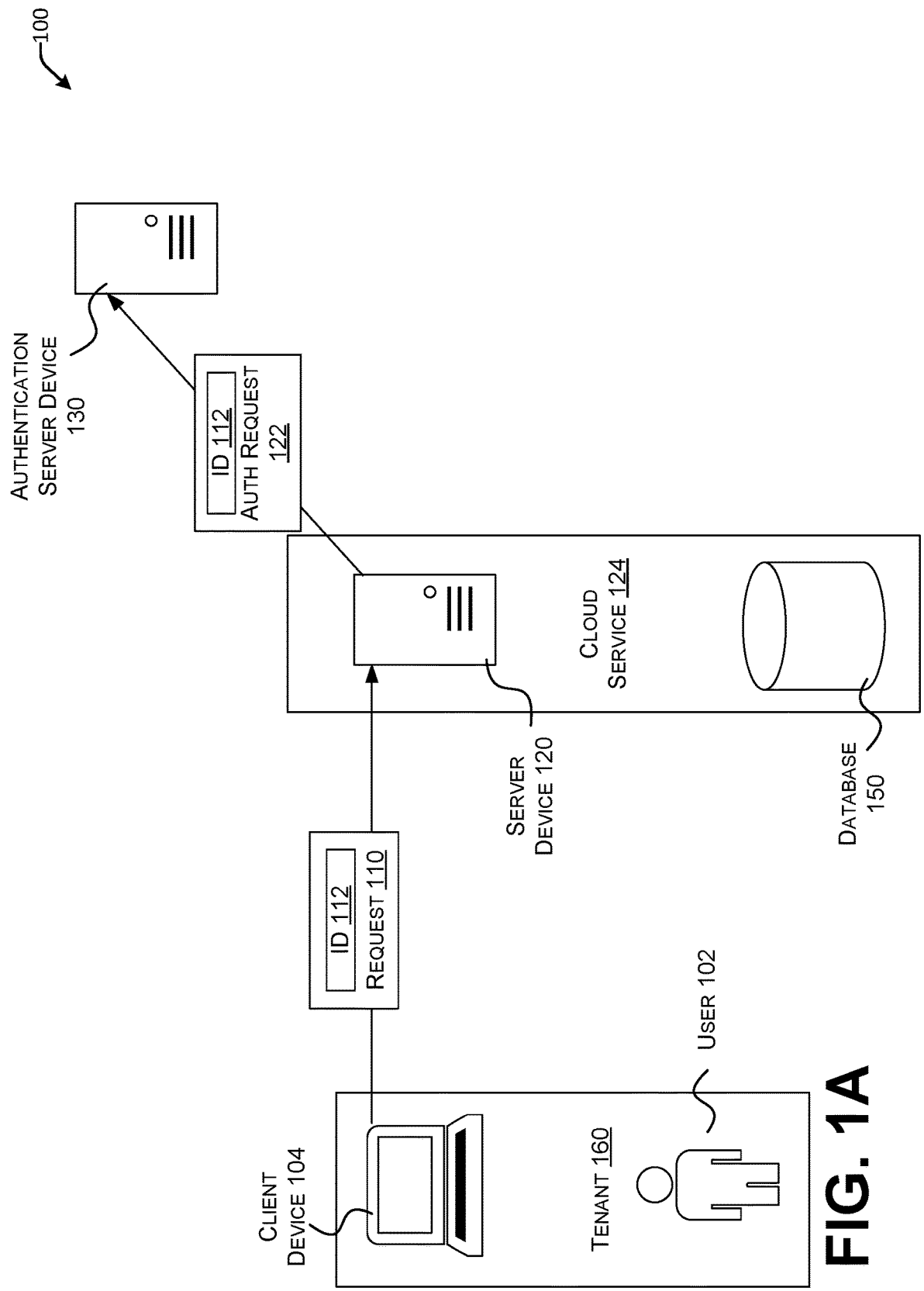

FIG. 1A illustrates user 102 of client device 104 submitting request 110 to server device 120 of cloud service 124. User 102 may be an entity of tenant 160 of cloud service 124. As referred to herein, a tenant is a group of cloud service users that are administered collectively. Tenants may be created for organizations such as businesses, schools, or the like. Tenants are frequently viewed as a security boundary within the cloud service 124, such that data accessible to users within one tenant is not accessible, at least by default, to users of other tenants.

Client device 104 maybe any desktop computer, laptop computer, mobile phone, Internet of Things device, automobile, virtual or augmented reality headset, or any other computing device. Server device 120 represents one or more computing devices that perform the operations of cloud service 124.

Request 110 may be any type of network-based request, such as a web request or an HTTP request. Request 110 includes one or more identifiers 112. As referred to herein, identifiers are numbers, strings, or any other data that refers to an entity within cloud service 124. Identifiers may be in the form of a serial number, a globally unique identifier (GUID), a username, a username qualified with a domain name, or the like. Typically, users, tenants, and computing resources are all associated with identifiers within cloud service 124. Operations performed within cloud service 124, such as a data retrieval operation, may use an identifier 112 to indicate which user the operation is for.

Additionally, or alternatively, identifier 112 may be a token. Identifier 112 maybe an authentication token of user 102, proving that the proper credentials were supplied to authenticate user 102.

As illustrated, in response to request 110, server device 120 sends authorization request 122 to authorization service device 130. Authorization request 122 includes identifier 112. The authorization request maybe a request for a "on-behalf-of" (OBO) token, which authorizes server device 120 to operate with the access rights associated with identifier 112. Service device 130 may be a directory server that cryptographically identifies, evaluates, and produces authentication and/or authorization tokens.

Database 150 is representative of a data access API provided by the cloud service. As discussed in more detail below, database 150 may be queried using identifier 112 and/or an OBO token to retrieve data specific to user 102. Another example of a user-specific data access API is a file storage service. A file storage service may provide an operation that lists files associated with a particular user. User-specific operations are often implemented as functions that accept a user identifier or some other user credential as a parameter.

As referred to herein, a token refers to a cryptographically secured result of a security operation. Tokens are often passed between applications and devices as proof that the security operation was successfully performed. A recipient of a token may perform a cryptographic operation to validate that that the issuer of the token did in fact perform the claimed security operation. For example, a directory server may provide an authentication token after authenticating user credentials. The authentication token may then be used to track a user identity within cloud service 124. For example, a file retrieval data access API may use an authentication token to retrieve a file for the corresponding user.

Figure 1B:
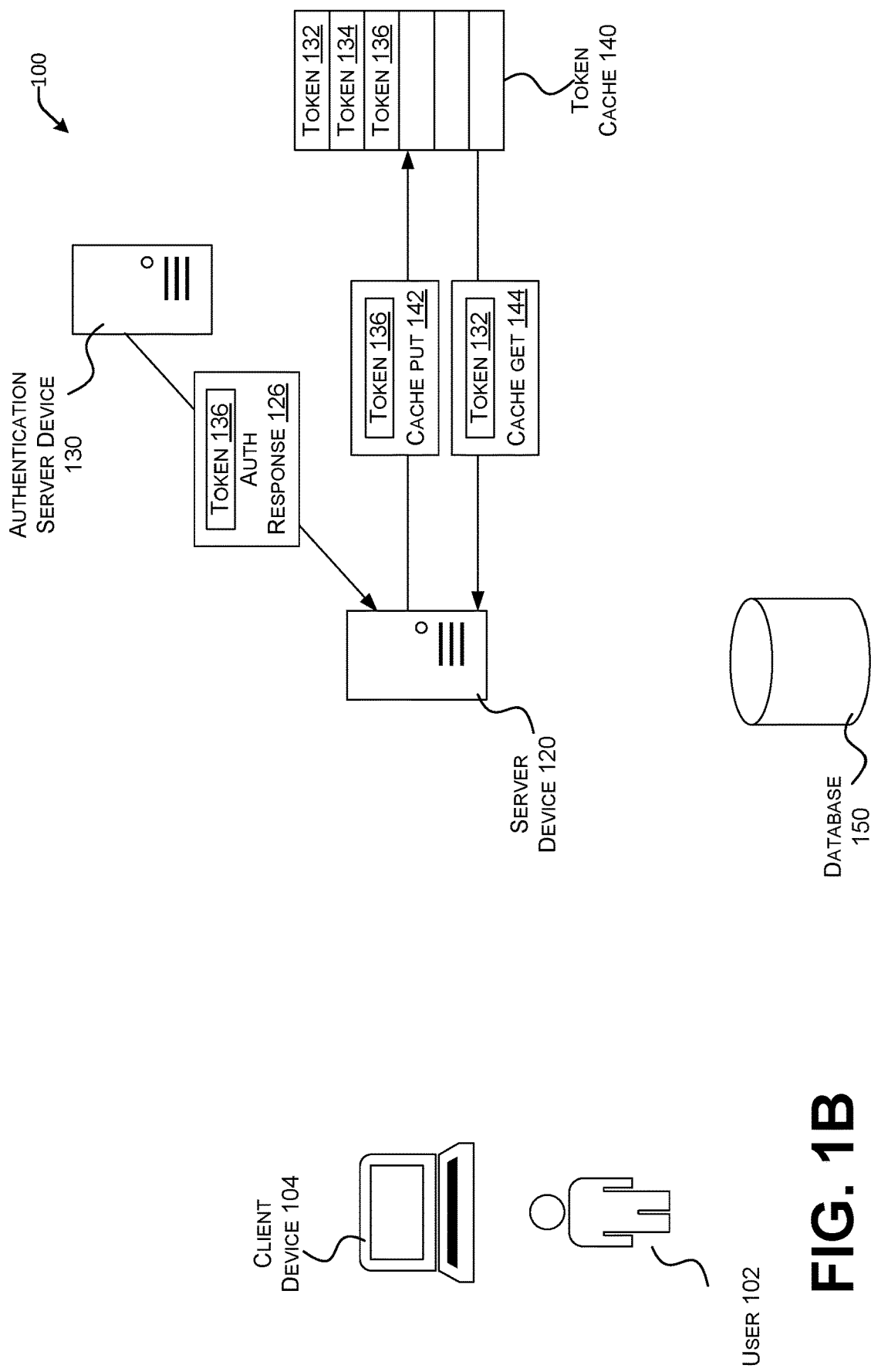

FIG. 1B illustrates authentication server device 130 responding to authorization request 122 with authorization response 126. Authorization response 126 includes token 136, which may be an OBO token granting server device 120 access to the cloud resources that user 102 is authorized to use. Upon receiving authorization response 126, server device 120 may invoke cache put operation 142 to add token 136 cache to token cache 140.

Token cache 140 stores authorization tokens 132, 134, and 136. Tokens 132 and 134 are maintained in token cache 140 for other requests, which may be from other users or other tenants. If tokens stored in token cache 140 are retrieved by the call path that added them, then data spillage will not occur. However, due to mundane programming errors, tokens stored while processing one web request may be returned to a call path that is processing a different web request. As illustrated, server device 120 invokes cache get operation 144. However, instead of retrieving token 136, which is associated with user 102 of tenant 160, token 132 is retrieved, which is associated with a different tenant. As discussed below, this error will cascade until data associated with this other tenant leaks into a response sent to user 102.

FIG. 1C illustrates server device 120 sending database request 152 to database 150. Database request 152 includes token 132, which was inadvertently retrieved from token cache 140. database 150 generates database response 154 containing data 156. Data 156 is associated with token 132, which is not associated with tenant 160. As a result, server device 120 leaks cross-tenant data when including data 156 in response 170 sent to client device 104.

Another source of cross tenant data spillage is the improper use of data cache 158. Similar to token cache 140, data cache 158 may be used properly to speed data access without causing a cross-tenant data leak. However, mundane and difficult to detect programming errors may result in retrieving data associated with the incorrect tenant from data cache 158 and including this data in response 170.

Figure 2:
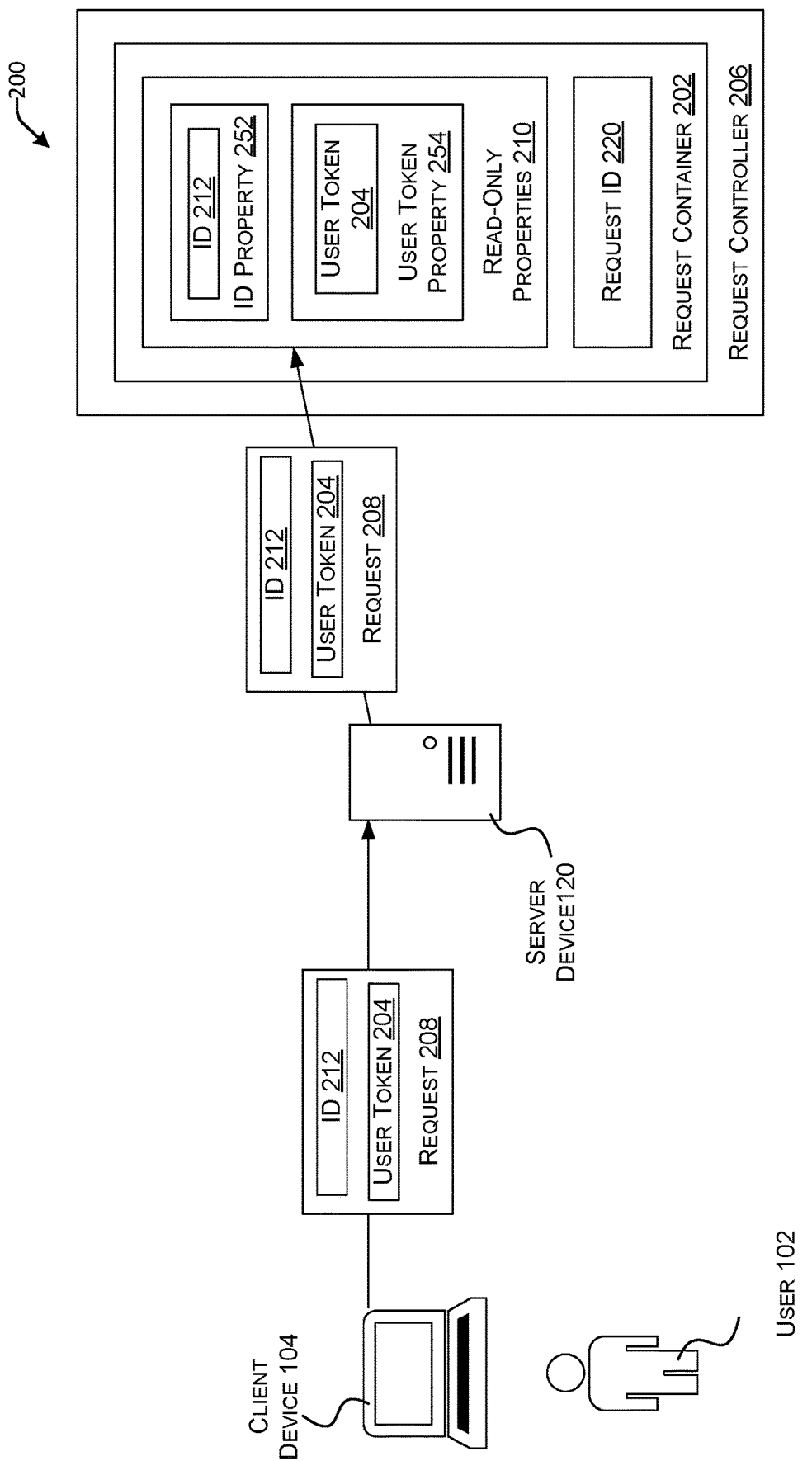
FIG. 2 illustrates creating and initializing a request container while processing a web request.

FIG. 2 illustrates creating and initializing a request container 202 while processing a web request 208 received from client device 104. Request 208 includes identifier 212, which is analogous to identifier 112 discussed above in conjunction with FIG. 1. Request 208 may also include user token 204, an authentication token that user 102 has already obtained from a directory server.

Request controller 206 is one example of a component of a web service that processes request 208. Request controller 206 may be the first user-defined component that is provided with request 208 by the underlying web server of server device 120. Request controller 206 may be responsible for processing request 208 and generating a corresponding response to be returned to user 102. Controllers are components of many common web application architectures, such as Model View Controller (MVC). However, controller 206 is just one example of a component of a web service, and other components implementing other architectures are similarly contemplated as processing request 208. In some configurations controller 206 is one example of a user data API. Additionally, or alternatively, controller 206 invokes a user data API, which may or may not execute on a different computing device as controller 206.

In some configurations, request controller 206 generates request container 202 from request 208 because request controller 206 is the first component that can access request 208 along the call path that responds to request 208. By applying the disclosed techniques as soon as possible along the call path that processes request 208, the greatest protection against cross-tenant data spillage is achieved.

As illustrated, request controller 206 extracts identifier 212 and/or user token 204 from the web request 208, and stores one or all of these values in corresponding read-only properties of request container 202. Specifically, identifier 212 is stored in identifier property 252 and user token 204 is stored in user token property 254. In some configurations, request 208 is passed to a constructor of request container 202, which extracts identifier 202 and or user token 204 and uses them to initialize the corresponding readonly properties 210. However, any comparable techniques for initializing readonly properties 210 with the identifiers and tokens included in request 208 are similarly contemplated.

Request container 202 also initializes request identifier 220-a unique identifier associated with request container 202. Request identifier 220 may be used throughout the disclosed embodiments to determine if two different request containers are in fact the same.

Figure 3:
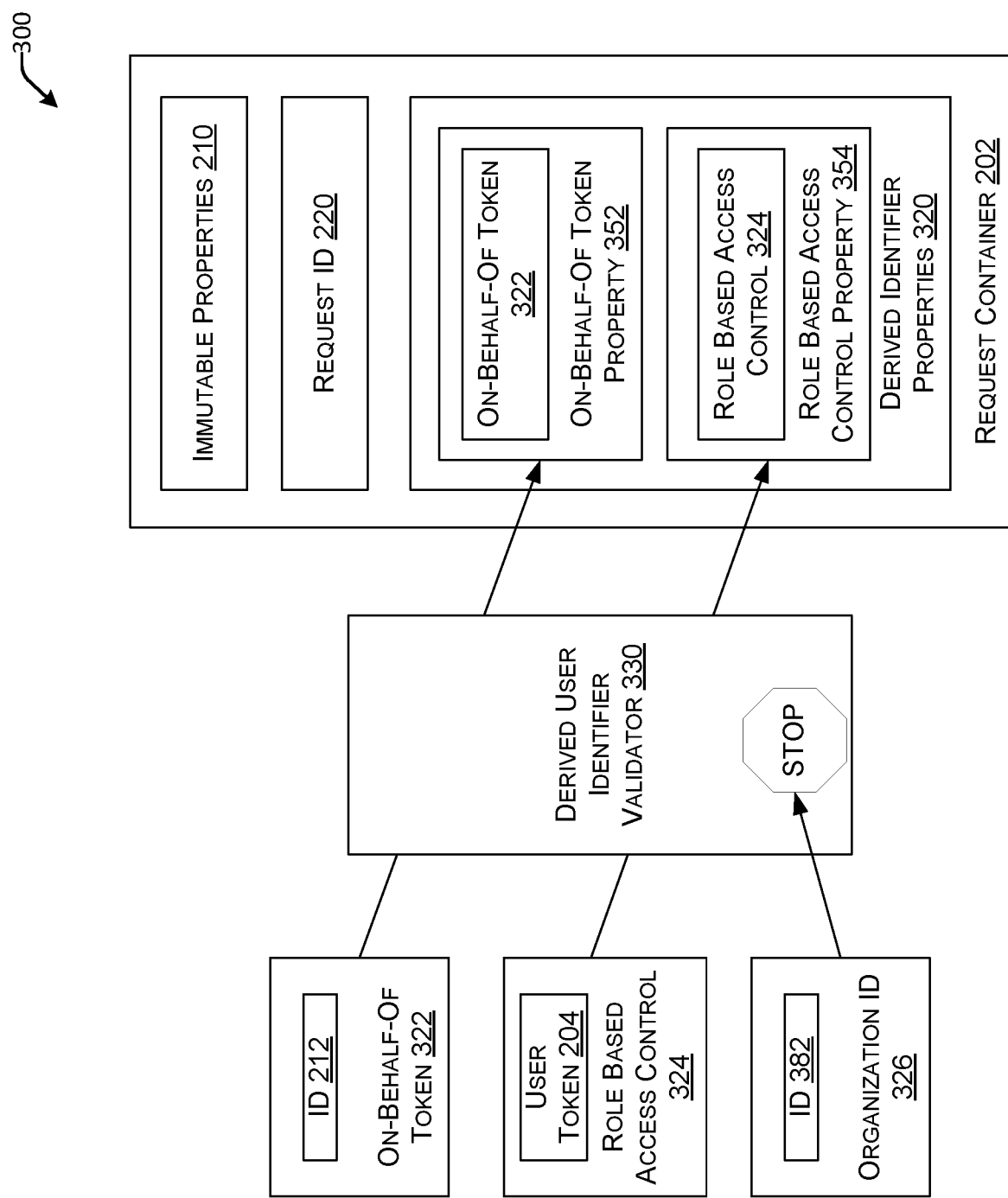
FIG. 3 illustrates adding derived identifiers to the request container.

FIG. 3 illustrates adding derived identifiers 322, 324, and 326 to the request container 202. On behalf of token 322, role based access control 324, and organization ID 326 are examples of derived identifiers. Derived identifiers are identification information, including tokens, that are often derived from information contained in the request 208. For example, user token 204 may be extracted from request 208 and used to obtain on behalf of token 322 from a directory server. In some configurations, derived identifiers include an identifier or token associated with tenant 160. As illustrated, on behalf of token 322 includes identifier 212, role based access control 324 includes user token 204, and organization ID 326 includes identifier 382.

Request controller 206 may obtain these derived identifiers and attempt to add them to request container 202. Derived user identifier validator 330 analyses the derived identifiers to determine whether they are in fact associated with tenant 160. In some configurations, derived user identifier validator 330 inspects the identifiers stored within a candidate derived identifier to determine if it is in fact associated with tenant 160. Derived user identifier validator 330 may apply cryptographic techniques when performing this determination. As illustrated, on behalf of token 322 and role based access control 324 are to determined to be associated with tenant 160 based the identifiers included within them. Accordingly, on behalf of token 322 and role based access control 324 are added to corresponding properties of derived identifier properties 320. Specifically, the value of on behalf of token property 352 is set to on behalf of token 322, and the value of role based access control property 354 is set to roll based access control 324. In contrast, organization ID 326 is found to be associated with a different identifier 382, and as such is blocked from being added to request container 202.

When a data access API of cloud service 124 is invoked, any parameters that specify identifying information are directly or indirectly obtained from one of a immutable properties 210 or derived identifier properties 320. For example, identifier 212 may be directly copied as a parameter of a data access API. Additionally, or alternatively, identifiers and or derived identifiers obtained from request container 202 maybe combined or formatted before being provided as a parameter to a user data API. For example, a series of immutable properties or derived identifier properties maybe combined using a string concatenation technique into a single parameter of a data access API. By obtaining identifying information from request container 202, the possibility of providing an identifier associated with a different tenant is eliminated.

These specific types of derived identifiers and the identifiers stored within them are examples selected for illustrative purposes. Any other types of derived identifiers, and the identifiers stored within them, are similarly contemplated. Furthermore, the technique of analyzing an identifier contained within a candidate derived identifier is one example of validating that a derived identifier is associated with the correct tenant. Other techniques, such as supplying the candidate derived identifier to a directory service for confirmation is similarly contemplated. In some techniques, the candidate derived identifier does not contain an identifier that associates the candidate derived identifier with the tenant 160.

Figure 4A:
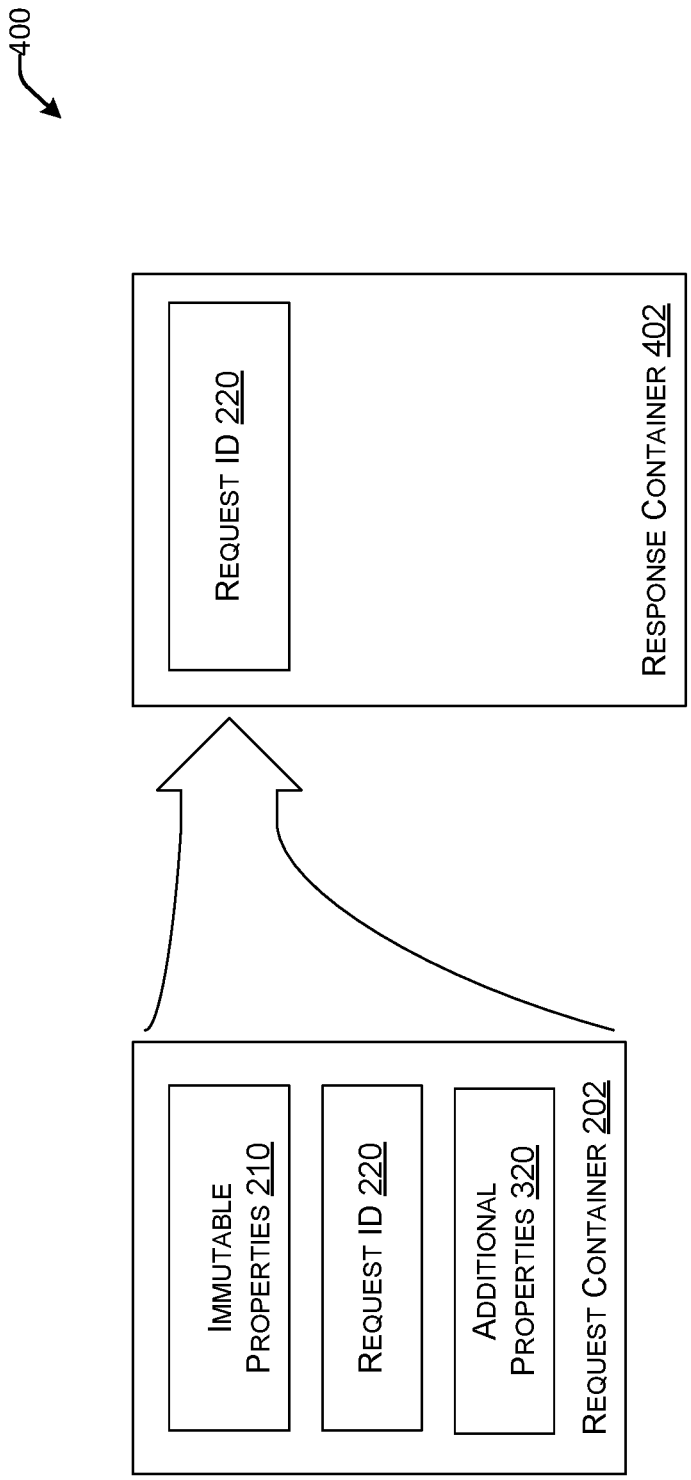
FIG. 4A illustrates creating and initializing a response container.

FIG. 4A illustrates creating and initializing a response container 402. Response container 402 may be initialized with request container 202. For example a constructor of response container 402 may take a request container as a parameter. In other embodiments, response container 402 is initialized with individual properties of request container 202. In other embodiments, response container 402 may store request identifier 220 instead of a complete copy of request container 402. In either case, response container 402 is immutably associated with request container 202. As data is added to request container 402, request ID 220 may be used to confirm that the data being added is associated with the correct tenant 160.

Other techniques for obtaining response container 402 are similarly contemplated. In addition to directly constructing and initializing response container 402, response container 402 may be obtained by calling a member function of request container 202 that returns response containers. In other configurations, response container 402 is part of the same class/struct/object as request container 202—i.e. the properties and methods of request container 202 and response container 402 are combined into a single container that is passed along the call path taken while generating a response. In some configurations, request container 202 is used to provide identifiers when invoking cloud services without storing results in response container 402.

Figure 4B:
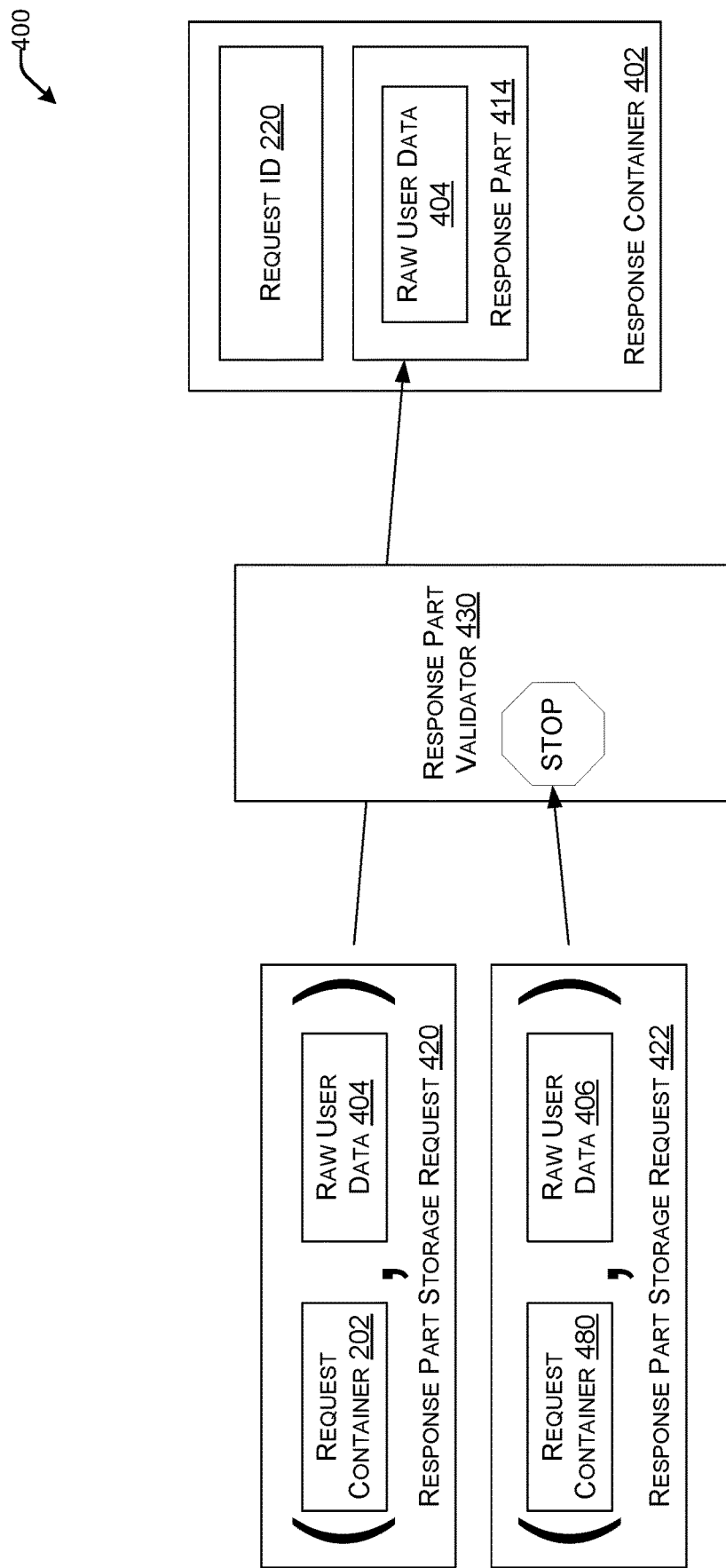
FIG. 4B illustrates invoking a user data API with the request and response containers.

FIG. 4B illustrates invoking a user data API with the request container 202 and the response container 402. While processing web request 208, request container 202 and response container 402 are passed along the call path that processes request 208. Along the call path, data access APIs of cloud service 124 may be invoked to obtain data, files, or other information associated with user 102 and/or tenant 160. FIG. 4B Illustrates one example of how raw user data returned from a user data API is validated before being stored in response container 402.

Raw user data 404 and 406 may be the result of invoking a data access API, such as a file enumeration API, a database query, or other information retrieval mechanism. In some configurations, identification information passed to the user data API is obtained from request container 202, as discussed above in conjunction with FIG. 3B.

Response part storage request 420 illustrates the invocation of a method that stores raw user data 404 in response container 402. Request container 202—or the request identifier of request container 202—is also passed to the invocation of response part storage request 420. Before storing raw user data 404 in response container 402, response part validator 430 ensures that request container 202 matches request identifier 220. Similarly, response part validator 430 prevents response part storage request 422 from being added to response container 402 because request container 480 is not associated with response container 402. In this way, only data obtained while responding to the correct request is allowed to be stored as a response part 414 of response container 402.

Figure 5A:
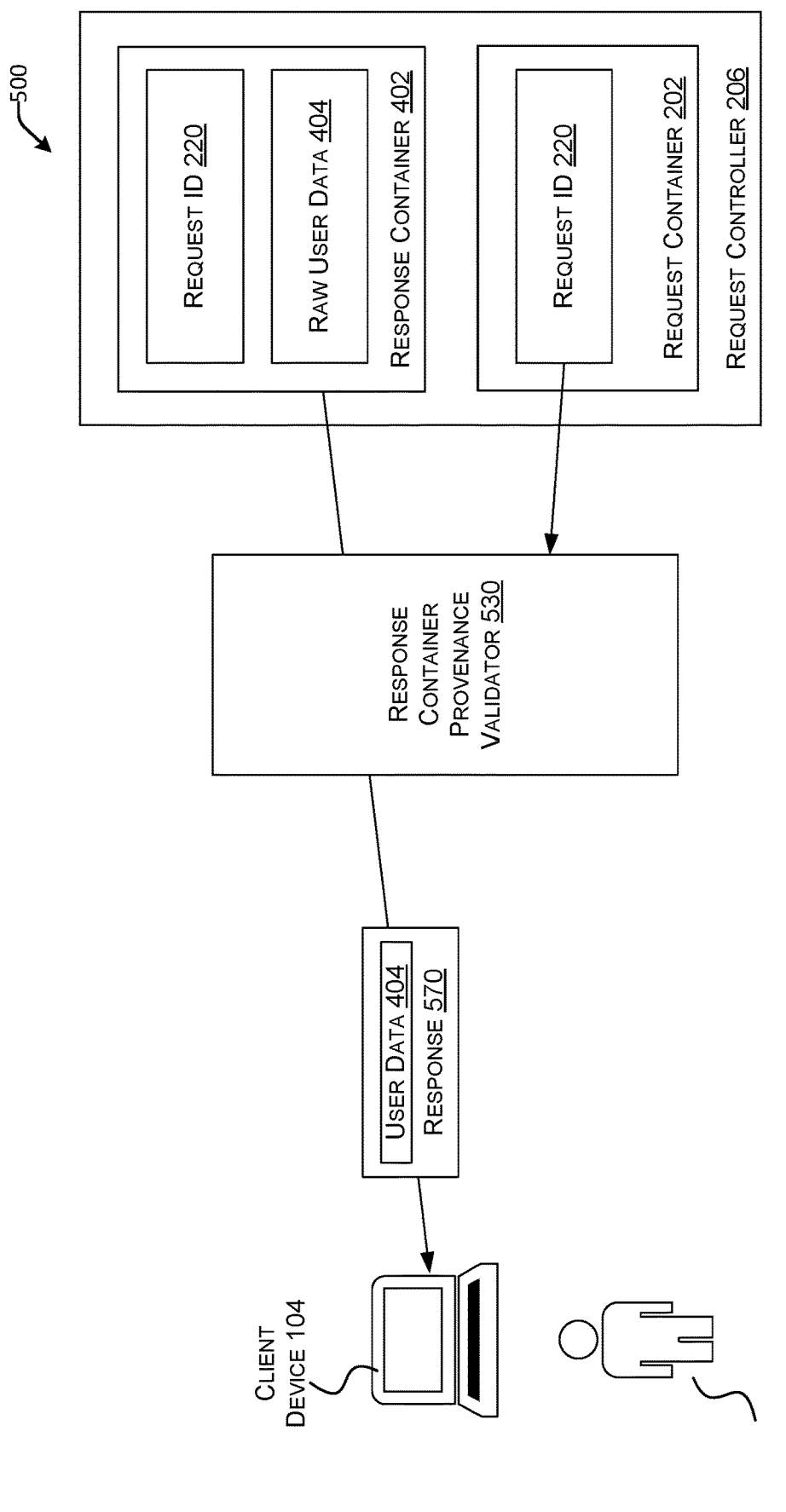
FIGS. 5A-5B illustrate validating that a web response is generated with the correct response container.

FIG. 5A illustrates validating that a web response is generated with the correct response container. A call path taken to process request 208 has resumed executing within request controller 206. Response container 402 now contains raw user data 404. Before sending response 570 to request 208, request controller 206 first verifies that response container 402 is in fact associated with request 208. Specifically, response container provenance validator 530 confirms that request ID 220 of response container 402 matches request ID 220 of request container 202. If these request containers match, then response container 402 contains raw user data associated with request 208, and may be included in response 570.

Figure 5B:
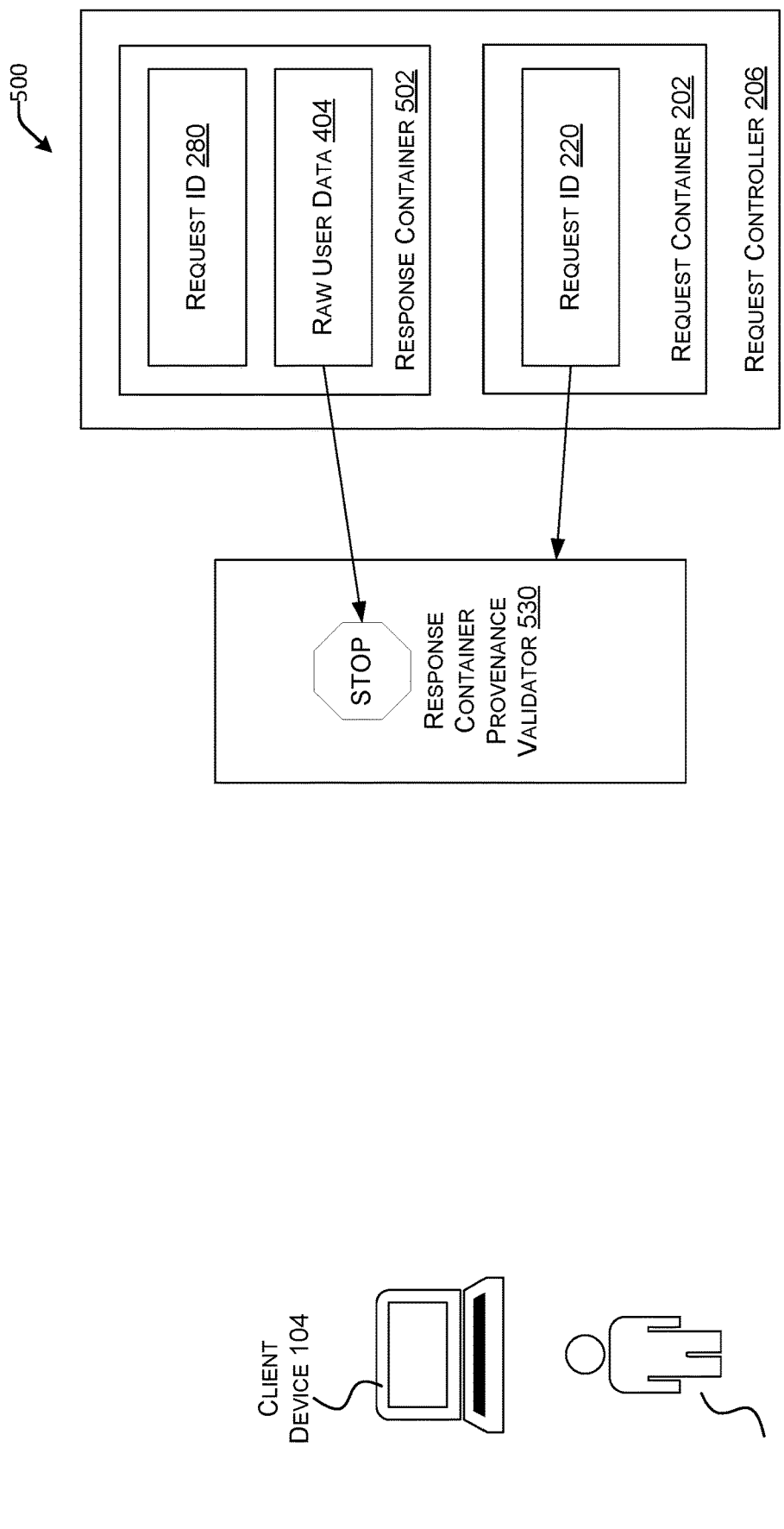

FIG. 5B illustrates validating that a web response is generated with the correct response container. As discussed above in conjunction with FIG. 5A, request controller 206 is prepared to generate a response to request 208. However, request controller 206 has obtained response container 502 containing request ID 280. Response container provenance validator 530 determines that response container 502 is not associated with request container 202 because request identifier 280 does not match request identifier 220. Accordingly, a cross tenant data leak is avoided by not returning raw user data 404 to client device 104.

Figure 6:
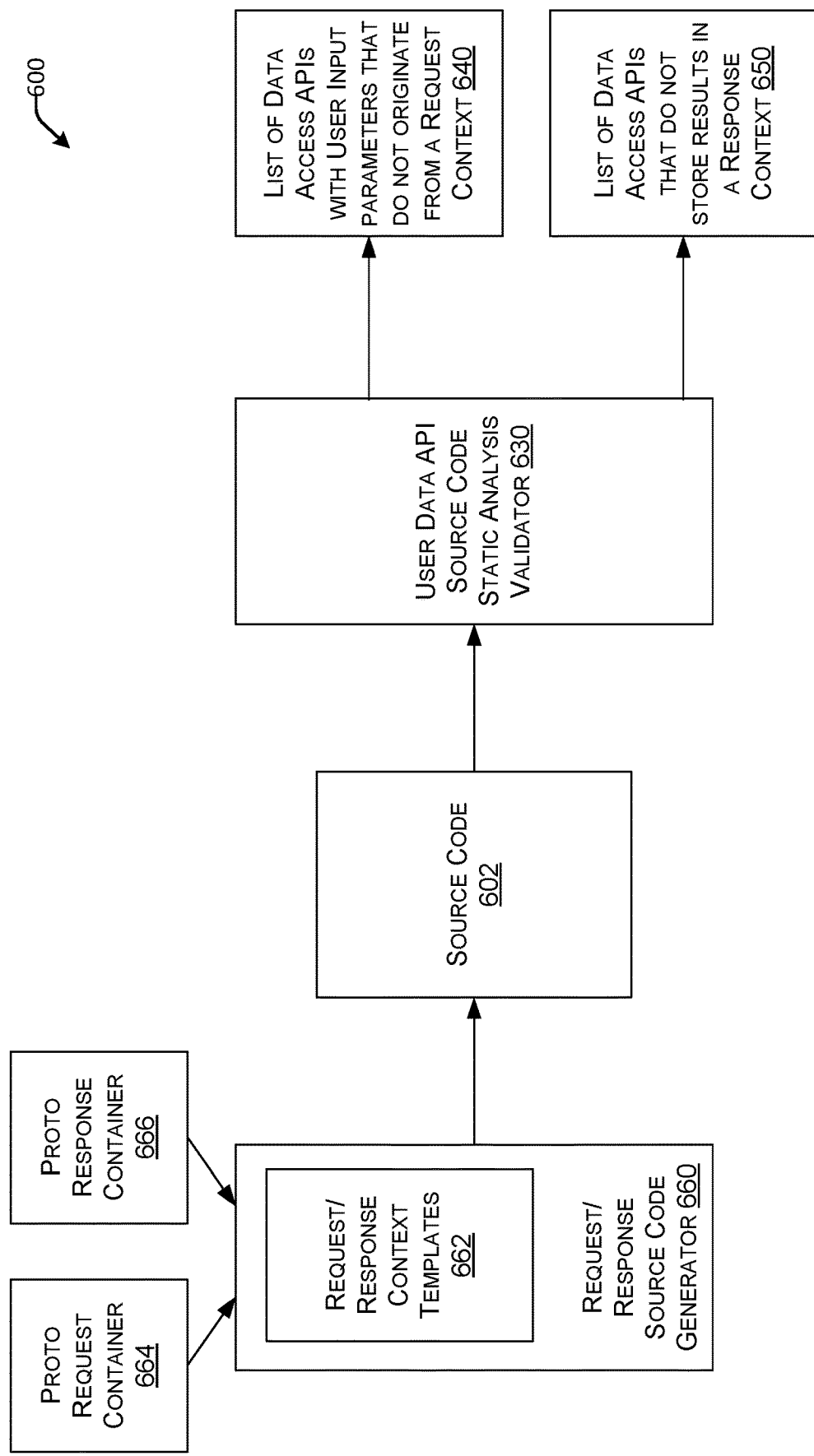
FIG. 6 illustrates a static source code analysis of a user data API for consistent use of the request and response containers.

FIG. 6 illustrates a static source code analysis of a user data API for consistent use of the request and response containers. Request container 202 and response container 402 are only as effective at preventing cross tenant data leaks as is their consistency of use along a code path that processes request 208. In some configurations, user data API source code static analysis validator 630 analyzes source code 602 to determine whether request containers and response containers are used consistently throughout. A list of data access API's with user input parameters that do not originate from a request context 640 may be generated, along with a list of data access APIs that do not store results in a response context 650.

Lists 640 and 650 may be provided to software engineers as warnings or errors. User data API source code static analysis validator 630 may be executed as part of a build process, a source code check in process, or a pre-deployment process in order to ensure correct usage of request and response containers.

In some configurations, a source code definition of a data access API is annotated with an indication that it obtains data for a particular user or tenant. The data access API may be annotated with comments, tags, attributes, particular data types, or any comparable programming technique. The parameters of the data access API may also be annotated to indicate which parameters contain identifying information. User data API source code static analysis validator 630 may analyze call sites that invoke the data access API to ensure that values passed to an identifying information parameter originate from a request container. Similarly, User data API source code static analysis validator 630 may analyze call sites that invoke the data access API to ensure that data provided by the data access API is stored—or directly stored—in a response container 402. In some configurations, user data API source code static analysis validator 630 also verifies that request containers are initialized with data extracted from web request 208.

An application that consistently stores identifying information in immutable properties of a request container, that invokes data access APIs with identifying information obtained from a request container, that stores data returned from the data access API directly in a response container, and that verifies the provenance of a response container when generating a web response, well seldom if ever leak cross tenant data.

FIG. 6 also illustrates one way in which source code definitions of request and response containers may be automatically generated. Specifically, request/response source code generator 660 may apply one or more of request templates 662 to a proto request container 664 to generate source code of request container 202. Similarly, source code generator 660 may apply one or more of response templates 662 to proto response container 666 to generate response container 402. Templates 662 may include base classes from which the generated containers derive. The request and/or response containers generated by source code generator 660 comply with requirements enforced by user data API source code static analysis validator 630.

For example, proto request container 664 may include a list of properties that are intended to be included in request container 202. Some of the properties may be marked as read-only. Source code generator 660 may generate corresponding immutable properties in request container 202—i.e. by decorating the immutable properties with a keyword (e.g. 'readonly' or 'const'), attribute, or other technique for indicating that once initialized the immutable property cannot be changed. Code generator 660 may also generate a constructor or other initialization function usable to initialize the immutable properties directly from arguments. Additionally, or alternatively, code generator 660 may generate a constructor or other initialization function to initialize the immutable properties from values extracted from an HTTP context or other data structure obtained from request 208.

Source code generator 660 may also detect derived identifier properties in a proto request container 664 that are associated with a validator. A validator, e.g. derived user identifier validator 330, refers to a function or other source code that ensures that any derived identifier property values are associated with the correct identifier 212 before being added to request container 202. Source code generator 660 may apply the validator by generating a property in the generated request container 202 that invokes the validator before allowing the derived identifier property to be set. The validator may be a member function of a base class that the generated request container 202 derives from. However, an inline function, a free function, or any other type or location of validator function is similarly contemplated.

Source code generator 660 may also be used to generate response containers 402. Proto response container 666 may include a list of properties usable when generating response 570. Source code generator 660 may generate response container 402 to include a corresponding list of properties, each of which is associated with a setter function that accepts a request container and a value. The setter function generated by source code generator 660 may include code that confirms that the request container parameter matches the request container associated with the generated response container 402. If the request containers match, the generated source code allows the value of the property to be set, otherwise an error is raised.

Figure 7:
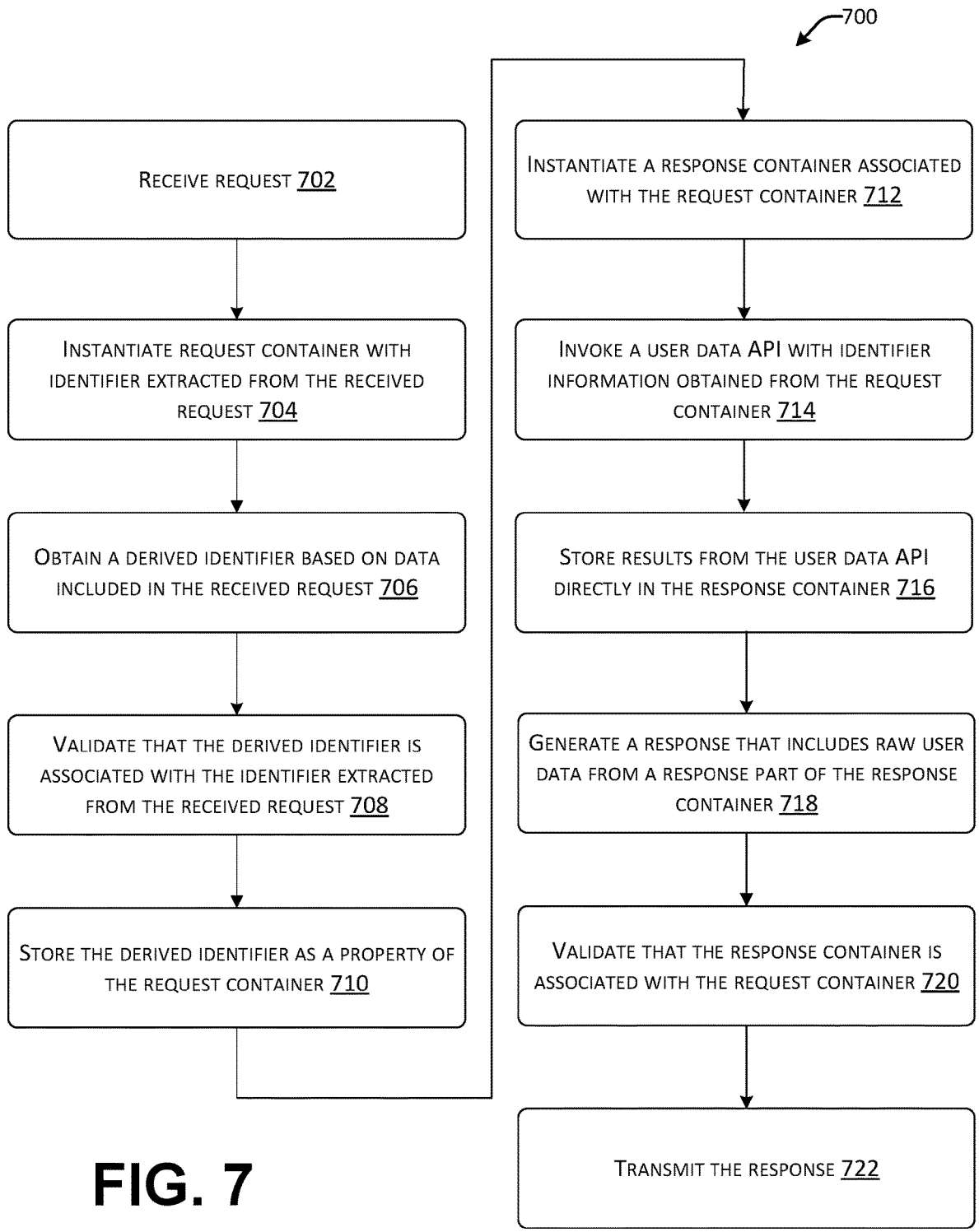
FIG. 7 is a flow diagram of an example method for validating the provenance of data transmitted in a web response.

Turning now to FIG. 7, aspects of a routine for enabling a system to prevent data spillage in multi-tenant services via request and response containerization with provenance checks is shown and described. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 700 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 700 may be also implemented in many other ways. For example, the routine 700 may be implemented, at least in part, by a processor of another remote computer or a local circuit. In addition, one or more of the operations of the routine 700 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 7, routine 700 begins at operation 702 where the system receives web request 208.

Next at operation 704, controller 206 Creates request container 402 with identification information extracted from request 208.

Next at operation 706, Controller 206 obtains a derived identifier 322 based on data included in the received request 208.

Next at operation 708, request container 202 Validates that the derived identifier 322 is Next at operation 710, request container 202 stores the derived identifier 322 as a derived identifier property. The Derived identifier property is not immutable, but it is validated as properly associated with tenant 160 before being modified.

Next at operation 712, controller 206 creates a response container 402 associated with the request container 202.

Next at operation 714, along they call path taken while processing request 208, a user data API is invoked with identifier information obtained from the request container 402.

Next at operation 716, results from the user data API are validated as being associated with tenant 160 before being stored directly in the response container 402.

Next at operation 718, controller 206 generates a response 570 that includes raw user data 404 for my response part 414 of the response container 402.

Next at operation 720, controller 206 validates that the response container 402 is associated with the request container 202 by comparing request identifiers 220.

Next at operation 722, controller 206 transmits the response 570 to client device 104.

Figure 8:
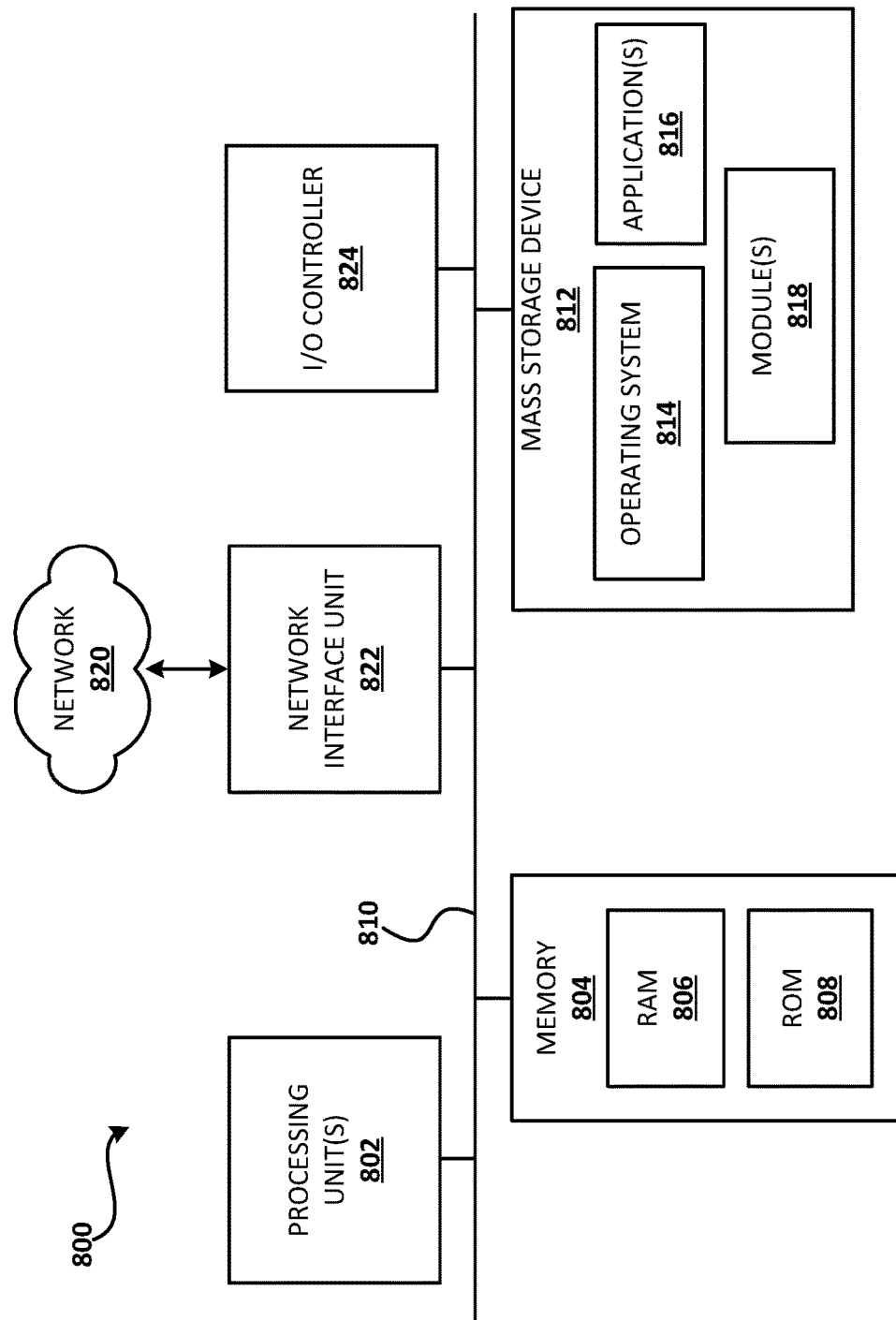
FIG. 8 is a computer architecture diagram illustrating an illustrative computer hardware and software architecture for a computing system capable of implementing aspects of the techniques and technologies presented herein.

FIG. 8 shows additional details of an example computer architecture 800 for a device, such as a computer or a server illustrated in FIG. 1, capable of executing computer instructions (e.g., a module or a program component described herein). The computer architecture 800 illustrated in FIG. 8 includes processing unit(s) 802, a system memory 804, including a random-access memory 806 ("RAM") and a read-only memory ("ROM") 808, and a system bus 810 that couples the memory 804 to the processing unit(s) 802.

Processing unit(s), such as processing unit(s) 802, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 800, such as during startup, is stored in the ROM 808. The computer architecture 800 further includes a mass storage device 812 for storing an operating system 814, application(s) 816, modules 818, and other data described herein.

The mass storage device 812 is connected to processing unit(s) 802 through a mass storage controller connected to the bus 810. The mass storage device 812 and its associated computer-readable media provide non-volatile storage for the computer architecture 800. Although the description of computer-readable media contained herein refers to a mass storage device, it should be appreciated by those skilled in the art that computer-readable media can be any available computer-readable storage media or communication media that can be accessed by the computer architecture 800.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 800 may operate in a networked environment using logical connections to remote computers through the network 820. The computer architecture 800 may connect to the network 820 through a network interface unit 822 connected to the bus 810. The computer architecture 800 also may include an input/output controller 824 for receiving and processing input from a number of other devices, including a keyboard, mouse, touch, or electronic stylus or pen. Similarly, the input/output controller 824 may provide output to a display screen, a printer, or other type of output device.

It should be appreciated that the software components described herein may, when loaded into the processing unit(s) 802 and executed, transform the processing unit(s) 802 and the overall computer architecture 800 from a general-purpose computing system into a special-purpose computing system customized to facilitate the functionality presented herein. The processing unit(s) 802 may be constructed from any number of transistors or other discrete circuit elements, which may individually or collectively assume any number of states. More specifically, the processing unit(s) 802 may operate as a finite-state machine, in response to executable instructions contained within the software modules disclosed herein. These computer-executable instructions may transform the processing unit(s) 802 by specifying how the processing unit(s) 802 transition between states, thereby transforming the transistors or other discrete hardware elements constituting the processing unit(s) 802.

Figure 9:
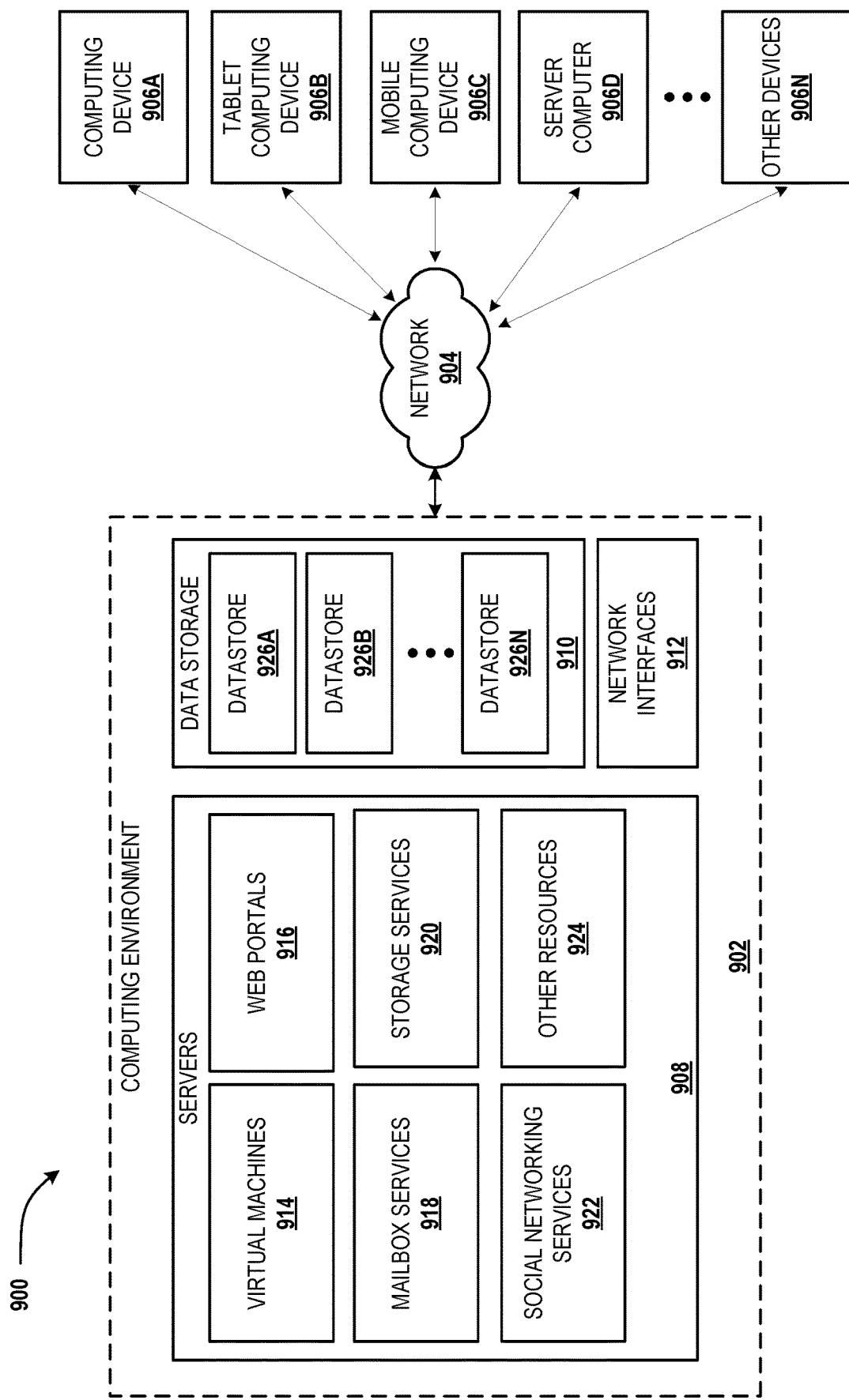
FIG. 9 is a diagram illustrating a distributed computing environment capable of implementing aspects of the techniques and technologies presented herein.

FIG. 9 depicts an illustrative distributed computing environment 900 capable of executing the software components described herein. Thus, the distributed computing environment 900 illustrated in FIG. 9 can be utilized to execute any aspects of the software components presented herein. For example, the distributed computing environment 900 can be utilized to execute aspects of the software components described herein. Accordingly, the distributed computing environment 900 can include a computing environment 902 operating on, in communication with, or as part of the network 904. The network 904 can include various access networks. One or more client devices 906A-906N (hereinafter referred to collectively and/or generically as "clients 906" and also referred to herein as computing devices 906) can communicate with the computing environment 902 via the network 904. In one illustrated configuration, the clients 906 include a computing device 906A such as a laptop computer, a desktop computer, or other computing device; a slate or tablet computing device ("tablet computing device") 906B; a mobile computing device 906C such as a mobile telephone, a smart phone, or other mobile computing device; a server computer 906D; and/or other devices 906N. It should be understood that any number of clients 906 can communicate with the computing environment 902.

In various examples, the computing environment 902 includes servers 908, data storage 910, and one or more network interfaces 912. The servers 908 can host various services, virtual machines, portals, and/or other resources. In the illustrated configuration, the servers 908 host virtual machines 914, Web portals 916, mailbox services 918, storage services 920, and/or, social networking services 922. As shown in FIG. 9 the servers 908 also can host other services, applications, portals, and/or other resources ("other resources") 924.

As mentioned above, the computing environment 902 can include the data storage 910. According to various implementations, the functionality of the data storage 910 is provided by one or more databases operating on, or in communication with, the network 904. The functionality of the data storage 910 also can be provided by one or more servers configured to host data for the computing environment 902. The data storage 910 can include, host, or provide one or more real or virtual datastores 926A-926N (hereinafter referred to collectively and/or generically as "datastores 926"). The datastores 926 are configured to host data used or created by the servers 708 and/or other data. That is, the datastores 926 also can host or store web page documents, word documents, presentation documents, data structures, algorithms for execution by a recommendation engine, and/or other data utilized by any application program. Aspects of the datastores 926 may be associated with a service for storing files.

The computing environment 902 can communicate with, or be accessed by, the network interfaces 912. The network interfaces 912 can include various types of network hardware and software for supporting communications between two or more computing devices including, but not limited to, the computing devices and the servers. It should be appreciated that the network interfaces 912 also may be utilized to connect to other types of networks and/or computer systems.

It should be understood that the distributed computing environment 900 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 900 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 900 to utilize the functionality described herein for providing the techniques disclosed herein, among other aspects.

The present disclosure is supplemented by the following example clauses.

Example 1: A method comprising: receiving a web request; extracting an identifier of a tenant from the web request; initializing a read-only property of a request container with the identifier; creating a response container that is associated with the request container; invoking a user data API with the request container and the response container, causing the user data API to: invoke a data access API with the identifier stored in the read-only property of the request container, and store raw user data returned from the data access API in the response container, wherein the response container validates that the raw user data is associated with the tenant; generating an http response that includes the raw user data stored in the response container; and transmitting the http response.

Example 2: The method of example 1, further comprising: obtaining a derived token; validating that the derived token is associated with the tenant; and storing the derived token in a derived token property of the request container, wherein the user data API invokes the data access API with the derived token stored in the derived token property.

Example 3: The method of example 2, wherein the web request includes a user token, and wherein the derived token comprises an on-behalf-of token obtained with the user token.

Example 4: The method of example 2, wherein the association between the derived token and the tenant is validated by comparing the identifier to an individual identifier stored in the derived token.

Example 5: The method of example 1, wherein the raw user data is stored in the response container by invoking a function with the raw user data and a request container that was used to invoke the data access API, and wherein the association between the raw user data and the tenant is validated by comparing tenant identifiers from the request container that was used to invoke the data access API and the request container associated with the response container.

Example 6: The method of example 1, wherein the response container is associated with the request container by storing a request identifier of the request container in the response container.

Example 7: The method of example 6, further comprising: validating that the response container is associated with the request container before transmitting the http response by comparing the request identifiers in the request container and the response container.

Example 8: The method of example 1, further comprising: analyzing source code of the user data API to validate that the data access API is invoked with the read-only property of the request container and that the raw user data is stored directly in the response container.

Example 9: A computer-readable storage medium having computer-executable instructions stored thereupon which, when executed by a processing device, cause the processing device to: receive a request; extract an identifier from the request; initialize a read-only property of a request container with the identifier; invoke a data access API with the identifier stored in the read-only property of the request container; generate a response that includes raw user data received from the data access API; and transmit the response.

Example 10: The computer-readable storage medium of example 9, wherein the computer-executable instructions further cause the processing device to: obtain a derived token based on data included in the request; validate that the derived token is associated with the identifier; and store the derived token in a derived token property of the request container, wherein the data access API is invoked with the derived token stored in the derived token property.

Example 11: The computer-readable storage medium of example 10, wherein the request includes a user token, and wherein the derived token comprises a role-based access control credential obtained with the user token.

Example 12: The computer-readable storage medium of example 11 wherein the computer-executable instructions further cause the processing device to: create a response container that is associated with the request container, wherein the raw user data returned from the data access API is validated as being associated with the identifier before being stored in the response container; and wherein the response is generated with the raw user data stored in the response container.

Example 13: The computer-readable storage medium of example 9, wherein the request comprises a web request, wherein the identifier is obtained from an http context generated while processing the web request, and wherein the request container is created before user code executes.

Example 14: The computer-readable storage medium of example 9, wherein the computer-executable instructions further cause the processing device to: analyze a source code of the data access API to identify parameters marked as user input; analyze a source code of an invocation of the data access API to validate that values passed to the parameters marked as user input originate from the request container.

Example 15: A computing device, comprising: a computer-readable storage medium having computer-executable instructions stored thereupon; and a processor that executes the computer-executable instructions, causing the computing device to: receive a request; extract an identifier from the request; initialize a read-only property of a request container with the identifier; create a response container that is associated with the request container; invoke a user data API with the request container and the response container, causing the user data API to: invoke a data access API with the identifier stored in the read-only property of the request container, and store raw user data returned from the data access API in the response container, wherein the response container validates that the raw user data is associated with the identifier; generate an http response that includes the raw user data obtained from the response container; and transmit the http response.

Example 16: The computing device of example 15, wherein the computer-executable instructions further cause the processing device to: obtain a derived token based on data included in the request; validate that the derived token is associated with the identifier; and store the derived token in a derived token property of the request container, wherein the user data API invokes the data access API with the derived token stored in the derived token property.

Example 17: The computing device of example 16, wherein the derived token comprises an organization identifier obtained with identifier.

Example 18: The computing device of example 15, wherein the computer-executable instructions further cause the processing device to: analyze a source code of the data access API to identify parameters marked as user input; analyze a source code of the user data API to validate that values passed to the parameters marked as user input originate from the request container.

Example 19: The computing device of example 15, wherein the computer-executable instructions further cause the processing device to: analyze a source code of the user data API to validate that values returned from the data access API are directly stored in the response container.

Example 20: The computing device of example 15, wherein the computer-executable instructions further cause the processing device to: analyze a source code of the data access API to identify parameters marked as user input; analyze a source code of the user data API to validate that values passed to the parameters marked as user input originate from immutable properties or derived identifier properties of the request container; and analyze a source code of the user data API to validate that only values returned from the data access API are directly stored in the response container.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
receiving a web request;
extracting an identifier of a tenant from the web request;
initializing a read-only property of a request container with the identifier;
creating a response container that is associated with the request container;
invoking a user data application program interface (API) with the request container and the response container, causing the user data API to:
 invoke a data access API with the identifier stored in the read-only property of the request container, and
 store raw user data returned from the data access API in the response container, wherein the response container validates that the raw user data is associated with the tenant;
generating a hypertext transfer protocol (HTTP) response that includes the raw user data stored in the response container; and
transmitting the HTTP response.

2. The method of claim 1, further comprising:
obtaining a derived token;
validating that the derived token is associated with the tenant; and
storing the derived token in a derived token property of the request container, wherein the user data API invokes the data access API with the derived token stored in the derived token property.

3. The method of claim 2, wherein the web request includes a user token, and wherein the derived token comprises an on-behalf-of token obtained with the user token.

4. The method of claim 2, wherein the association between the derived token and the tenant is validated by comparing the identifier to an individual identifier stored in the derived token.

5. The method of claim 1, wherein the raw user data is stored in the response container by invoking a function with the raw user data and a request container that was used to invoke the data access API, and wherein the association between the raw user data and the tenant is validated by comparing tenant identifiers from the request container that was used to invoke the data access API and the request container associated with the response container.

6. The method of claim 1, wherein the response container is associated with the request container by storing a request identifier of the request container in the response container.

7. The method of claim 6, further comprising:
validating that the response container is associated with the request container before transmitting the HTTP response by comparing the request identifiers in the request container and the response container.

8. The method of claim 1, further comprising:
analyzing source code of the user data API to validate that the data access API is invoked with the read-only property of the request container and that the raw user data is stored directly in the response container.

9. A non-transitory computer-readable storage medium having computer-executable instructions stored thereupon which, when executed by a processing device, cause the processing device to:
receive a request;
extract an identifier from the request;
initialize a read-only property of a request container with the identifier;
create a response container that is associated with the request container;
invoke a data access application program interface (API) with the identifier stored in the read-only property of the request container;
receive raw user data from the data access API;
store the raw user data in the response container;
generate a response that includes the raw user data stored in the response container; and
transmit the response.

10. The non-transitory computer-readable storage medium of claim 9, wherein the computer-executable instructions further cause the processing device to:
obtain a derived token based on data included in the request;
validate that the derived token is associated with the identifier; and
store the derived token in a derived token property of the request container, wherein the data access API is invoked with the derived token stored in the derived token property.

11. The non-transitory computer-readable storage medium of claim 10, wherein the request includes a user token, and wherein the derived token comprises a role-based access control credential obtained with the user token.

12. The non-transitory computer-readable storage medium of claim 11 wherein the computer-executable instructions further cause the processing device to:
validate that the raw user data returned from the data access API is associated with the identifier before being stored in the response container.

13. The non-transitory computer-readable storage medium of claim 9, wherein the request comprises a web request, wherein the identifier is obtained from a hypertext transfer protocol (HTTP) context generated while processing the web request, and wherein the request container is created before user code executes.

14. The non-transitory computer-readable storage medium of claim 9, wherein the computer-executable instructions further cause the processing device to:
analyze a source code of the data access API to identify parameters marked as user input;
analyze a source code of an invocation of the data access API to validate that values passed to the parameters marked as user input originate from the request container.

15. A computing device, comprising:
a non-transitory computer-readable storage medium having computer-executable instructions stored thereupon; and
a processor that executes the computer-executable instructions, causing the computing device to:
receive a request;
extract an identifier from the request;
initialize a read-only property of a request container with the identifier;
create a response container that is associated with the request container;
invoke a user data application program interface (API) with the request container and the response container, causing the user data API to:
 invoke a data access API with the identifier stored in the read-only property of the request container, and
 store raw user data returned from the data access API in the response container, wherein the response container validates that the raw user data is associated with the identifier;

generate a hypertext transfer protocol (HTTP) response that includes the raw user data obtained from the response container; and transmit the HTTP response.

16. The computing device of claim 15, wherein the computer-executable instructions further cause the processing device to:

obtain a derived token based on data included in the request;

validate that the derived token is associated with the identifier; and store the derived token in a derived token property of the request container, wherein the user data API invokes the data access API with the derived token stored in the derived token property.

17. The computing device of claim 16, wherein the derived token comprises an organization identifier obtained with identifier.

18. The computing device of claim 15, wherein the computer-executable instructions further cause the processing device to:

analyze a source code of the data access API to identify parameters marked as user input;

analyze a source code of the user data API to validate that values passed to the parameters marked as user input originate from the request container.

19. The computing device of claim 15, wherein the computer-executable instructions further cause the processing device to:

analyze a source code of the user data API to validate that values returned from the data access API are directly stored in the response container.

20. The computing device of claim 15, wherein the computer-executable instructions further cause the processing device to:

analyze a source code of the data access API to identify parameters marked as user input;

analyze a source code of the user data API to validate that values passed to the parameters marked as user input originate from immutable properties or derived identifier properties of the request container; and analyze a source code of the user data API to validate that only values returned from the data access API are directly stored in the response container.

* * * * *